(12) United States Patent
Yu et al.

(10) Patent No.: US 9,184,780 B2
(45) Date of Patent: *Nov. 10, 2015

(54) TRANSCEIVER AND RELATED SWITCHING METHOD APPLIED THEREIN

(71) Applicant: MediaTek Singapore Pte. Ltd., Singapore (SG)

(72) Inventors: Ti-Ku Yu, Yilan County (TW); Sang Won Son, Palo Alto, CA (US); Chia-Hsin Wu, New Taipei (TW); Tsung-Ming Chen, Hsinchu County (TW); Wei-Chia Chan, Taipei (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,469

(22) Filed: Apr. 19, 2015

(65) Prior Publication Data

US 2015/0229347 A1 Aug. 13, 2015

Related U.S. Application Data

(63) Continuation of application No. 14/043,862, filed on Oct. 2, 2013, now Pat. No. 9,042,844.

(60) Provisional application No. 61/753,246, filed on Jan. 16, 2013.

(51) Int. Cl.
*H04B 1/44* (2006.01)

(52) U.S. Cl.
CPC ........................................ *H04B 1/44* (2013.01)

(58) Field of Classification Search
USPC ........... 455/78, 79, 80, 82, 83, 280, 281, 292, 455/293; 330/195, 196, 197, 275, 276, 301; 333/32, 124
See application file for complete search history.

(56) References Cited

U.S. PATENT DOCUMENTS

| 6,809,581 | B2 * | 10/2004 | Rofougaran et al. | .......... 327/563 |
| 7,538,741 | B2 * | 5/2009 | Castaneda et al. | ............ 343/859 |
| 8,115,555 | B2 * | 2/2012 | An et al. | ........................ 330/301 |
| 8,229,367 | B2 * | 7/2012 | Chan et al. | ........................ 455/78 |
| 8,380,153 | B2 * | 2/2013 | Roufoogaran et al. | ........ 455/292 |
| 8,463,226 | B2 * | 6/2013 | Yu et al. | ......................... 455/334 |
| 8,570,235 | B2 * | 10/2013 | Ahn et al. | ..................... 343/860 |
| 8,649,740 | B2 * | 2/2014 | Lin et al. | .......................... 455/83 |

(Continued)

FOREIGN PATENT DOCUMENTS

| CN | 102195573 A | 9/2011 |
| TW | 201112620 A | 4/2011 |

OTHER PUBLICATIONS

Adil A. Kidwai, Chang-Tsung Fu, Jonathan C. Jensen, Stewart S. Taylor, A Fully Integrated Ultra-Low Insertion Loss T/R Switch for 802.11b/g/n. Application in 90 nm CMOS Process, IEEE Journal of Solid-State Circuits, May 2009, 1352-1360, vol. 44, No. 5.

(Continued)

*Primary Examiner* — Tuan A Tran
(74) *Attorney, Agent, or Firm* — Winston Hsu; Scott Margo

(57) ABSTRACT

A transceiver includes a power amplifying circuit, a first balance-unbalance circuit, a switchable matching circuit, and a low-noise amplifying circuit. The power amplifying circuit generates differential output signals during a transmitting mode of the transceiver. The first balance-unbalance circuit converts the differential output signals into a single-ended output signal. The switchable matching circuit receives the single-ended output signal on a signal port of the transceiver during the transmitting mode, and converts a single-ended receiving signal on the signal port into a single-ended input signal during a receiving mode of the transceiver. The low-noise amplifying circuit converts the single-ended input signal into a low-noise input signal during the receiving mode.

13 Claims, 7 Drawing Sheets

(56) References Cited

U.S. PATENT DOCUMENTS

2007/0152904 A1 7/2007 Castaneda
2010/0259319 A1* 10/2010 Chan et al. .................. 327/563
2011/0273355 A1* 11/2011 Ahn et al. .................... 343/860
2012/0154071 A1* 6/2012 Bradley et al. ............... 333/133
2012/0295556 A1* 11/2012 Chien et al. .................. 455/78

OTHER PUBLICATIONS

Chang-Tsung Fu, Hasnain Lakdawala, Stewart S. Taylor, Krishnamurthy Soumyanath, A 2.5GHz 32nm 0.35mm2 3.5dB NF −5dBm P1dB Fully Differential CMOS Push-Pull LNA with Integrated 34dBm T/R Switch and ESD Protection, ISSCC 2011 / Session 3 / RF Techniques / 3.3, Feb. 21, 2011, 56-57, and a page including Figure 3.3.7.

Richard Chang, David Weber, Meelan Lee, David Su, Katelijn Vleugels, Simon Wong, A Fully Integrated RF Front-End with Independent RX/TX Matching and +20dBm Output Power for WLAN Applications, Feb. 14, 2007, ISSCC 2007 / Session 31 / WLAN/Bluetooth / 31.4.

* cited by examiner

TRANSCEIVER AND RELATED SWITCHING METHOD APPLIED THEREIN

CROSS REFERENCE TO RELATED APPLICATIONS

This is a continuation of U.S. application Ser. No. 14/043,862, which claims the benefit of U.S. Provisional Application No. 61/753,246 (filed on Jan. 16, 2013). The entire contents of the related applications are incorporated herein by reference.

BACKGROUND

The invention relates to a transceiver and related switching method applied therein, and more particularly to a transceiver having an on-chip Balun and an on-chip TR (Transmit/Receive) switch, and a related method.

In a conventional transceiver, a TR (Transmit/Receive) switch is a device arranged to switch between a transmitter and a receiver of the transceiver. When the transceiver operates under a transmitting mode, the TR switch is arranged to couple the pre-transmitted signal outputted from the power amplifier to the antenna. When the transceiver operates under a receiving mode, the TR switch is arranged to couple the receiving signal of the antenna to the receiver. Two problems may arise from the conventional TR switch. The TR switch has intrinsic loss to the signal as it passes through because the TR switch may not be perfectly impedance matched with the transmitter and the receiver. The TR switch may also malfunction due to the large swing of the pre-transmitted signal when the transceiver operates under the transmitting mode.

For a differential communications system, an off-chip transformer balun (balanced/unbalanced) is further used to convert the signals between single ended and differential. An off-chip transformer balun will cause the overall cost higher because of the additional work of installing the off-chip transformer balun into the transceiver. Moreover, the off-chip transformer balun may occupy a large area of the PCB (Printed Circuit Board), which also increases the total cost.

Providing a low cost and low loss transceiver for the differential communications system is therefore a significant concern in this field.

SUMMARY

One objective of the present invention is to provide a transceiver having an on-chip Balun and an on-chip TR (Transmit/Receive) switch, and a related method.

According to a first embodiment of the present invention, a transceiver is disclosed. The transceiver includes a power amplifying circuit, a first balance-unbalance circuit (Balun), a switchable matching circuit, and a low-noise amplifying circuit. The power amplifying circuit is arranged to generate differential output signals during a transmitting mode of the transceiver. The first Balun is arranged to convert the differential output signals into a single-ended output signal. The switchable matching circuit is arranged to receive the single-ended output signal on a signal port of the transceiver during the transmitting mode, and to convert a single-ended receiving signal on the signal port into a single-ended input signal during a receiving mode of the transceiver. The low-noise amplifying circuit is arranged to convert the single-ended input signal into a low-noise input signal during the receiving mode.

According to a second embodiment of the present invention, a transceiver is disclosed. The transceiver includes a plurality of power amplifying circuit, a power combiner, a switchable matching circuit, and a low-noise amplifying circuit. The power amplifying circuits are arranged to generate a plurality of differential output signals respectively during a transmitting mode of the transceiver. The power combiner is arranged to combine the plurality of differential output signals into a single-ended output signal. The switchable matching circuit is arranged to receive the single-ended output signal on a signal port of the transceiver during the transmitting mode, and to convert a single-ended receiving signal on the signal port into a single-ended input signal during a receiving mode of the transceiver. The low-noise amplifying circuit is arranged to convert the single-ended input signal into a low-noise input signal during the receiving mode.

According to a third embodiment of the present invention, a transceiver is disclosed. The transceiver includes a power amplifying circuit, a first balance-unbalance circuit (Balun), a matching circuit, and a low-noise amplifying circuit. The power amplifying circuit is arranged to generate differential output signals during a transmitting mode of the transceiver. The first Balun is arranged to convert the differential output signals into a single-ended output signal. The matching circuit is arranged to convert a single-ended receiving signal into a single-ended input signal during a receiving mode of the transceiver. The low-noise amplifying circuit is arranged to convert the single-ended input signal into a low-noise input signal during the receiving mode. The power amplifying circuit, the first Balun, the matching circuit and the low-noise amplifying circuit are configured in a single chip.

According to a fourth embodiment of the present invention, a transceiver is disclosed. The transceiver includes a power amplifying circuit, a first balance-unbalance circuit (Balun), a matching circuit, and a low-noise amplifying circuit. The power amplifying circuit is arranged to generate differential output signals during a transmitting mode of the transceiver. The first Balun is arranged to convert the differential output signals into a single-ended output signal. The matching circuit is arranged to convert a single-ended receiving signal into a single-ended input signal during a receiving mode of the transceiver. The low-noise amplifying circuit is arranged to convert the single-ended input signal into a low-noise input signal during the receiving mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
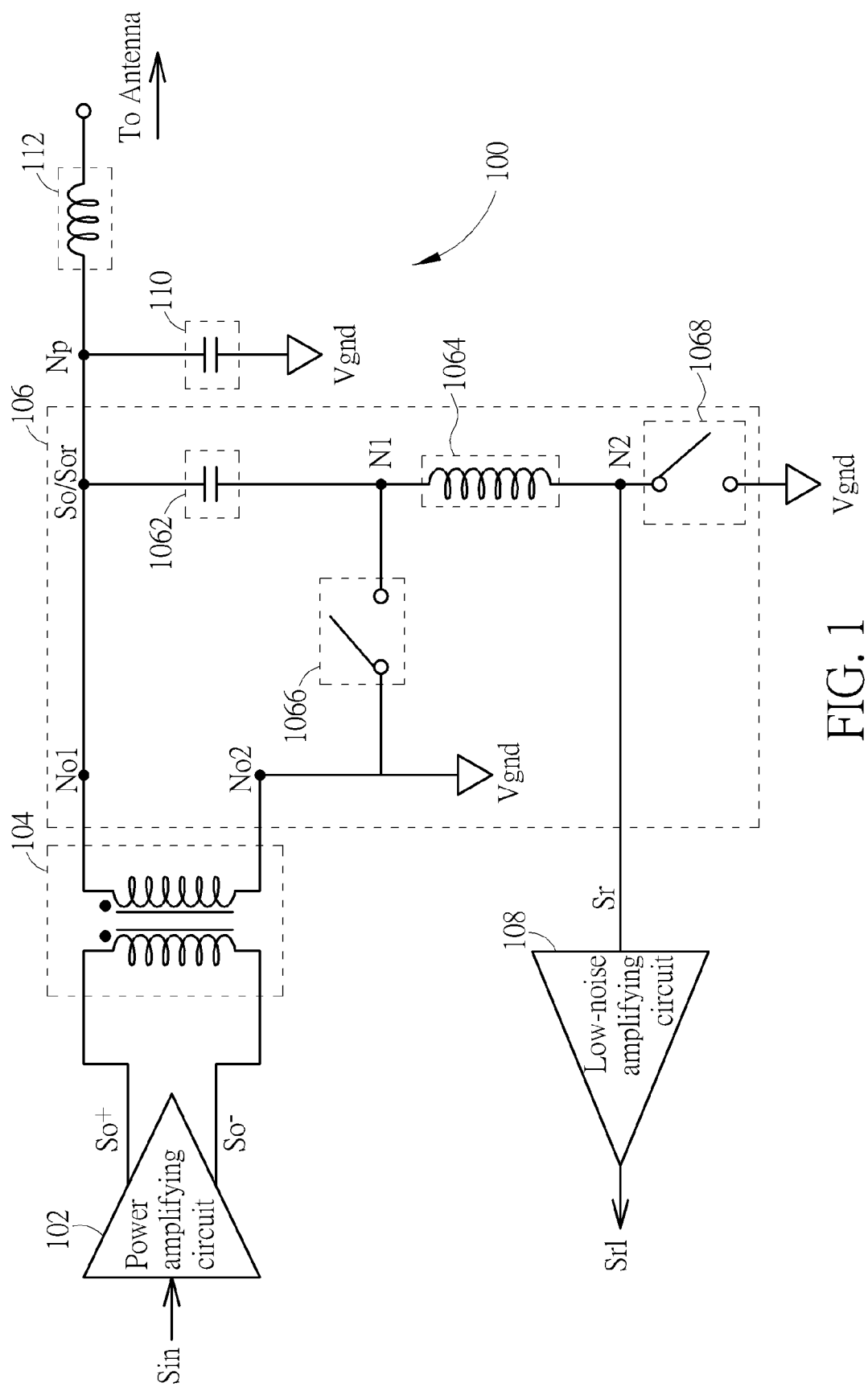
FIG. 1 is a diagram illustrating a transceiver according to a first embodiment of the present invention.

Please refer to FIG. 1, which is a diagram illustrating a transceiver 100 according to a first embodiment of the present invention. The transceiver 100 comprises a power amplifying circuit 102, a balance-unbalance circuit (Balun) 104, a switchable matching circuit 106, a low-noise amplifying circuit 108, a capacitive circuit 110, and an inductive circuit 112. The power amplifying circuit 102 is arranged to generate differential output signals So+, So−. The Balun 104 is arranged to convert the differential output signals So+, So− into a single-ended output signal So. The switchable matching circuit 106 is arranged to receive the single-ended output signal So on a signal port Np of the transceiver 100 during a transmitting mode of the transceiver 100, and to convert a single-ended receiving signal Sor on the signal port Np into a single-ended input signal Sr during a receiving mode of the transceiver 100. The low-noise amplifying circuit 108 is arranged to convert the single-ended input signal Sr into a low-noise input signal Srl.

It should be noted that the capacitive circuit 110 is a parasitic capacitor on the signal port Np, which is a semiconductor pad of the transceiver 100. Therefore, the capacitive circuit 110 can be seen as a capacitor coupled between the signal port Np and a reference voltage, i.e. the ground voltage Vgnd. Moreover, the inductive circuit 112 is an inherent inductor of a bond-wire coupled between the signal port Np and the antenna (not shown). Thus, the inductive circuit 112 can be seen as an inductor coupled between the signal port Np and the antenna, wherein the antenna is arranged to transmit/receive a wireless signal. According to the present embodiment, the power amplifying circuit 102, the Balun 104, the switchable matching circuit 106, and the low-noise amplifying circuit 108 are configured as a single chip, e.g. an SOC (System-on-chip).

The power amplifying circuit 102 is a differential PA (Power Amplifier) for generating the differential output signals So+, So− according to an input signal Sin, which can be a differential or single-ended signal. The Balun 104 is a transformer, which comprises a first input terminal receiving the output signal So+, and a second input terminal receiving the output signal So−. The Balun 104 further comprises a first output terminal No1 for outputting the single-ended output signal So and a second output terminal No2 coupled to the ground voltage Vgnd.

The switchable matching circuit 106 comprises a capacitive circuit 1062, an inductive circuit 1064, a first switching circuit 1066, and a second switching circuit 1068. The capacitive circuit 1062 is a capacitor having a first terminal coupled to the first output terminal No1 of the Balun 104. The inductive circuit 1064 is an inductor having a first terminal N1 coupled to a second terminal of the capacitive circuit 1062, and a second terminal N2 coupled to the input terminal of the low-noise amplifying circuit 108. The first switching circuit 1066 is arranged to couple the second terminal (i.e. N1) of the capacitive circuit 1062 to the ground voltage Vgnd during the transmitting mode, and disconnect the second terminal of the capacitive circuit 1062 from the ground voltage Vgnd during the receiving mode. The second switching circuit 1068 is arranged to couple the second terminal N2 of the inductive circuit 1064 to the ground voltage Vgnd during the transmitting mode, and disconnect the second terminal N2 of the inductive circuit 1064 from the ground voltage Vgnd during the receiving mode. It should be noted that the second switching circuit 1068 is optional, which means that the second switching circuit 1068 is can be removed in another embodiment to further reduce the chip size of the transceiver.

Figure 2:
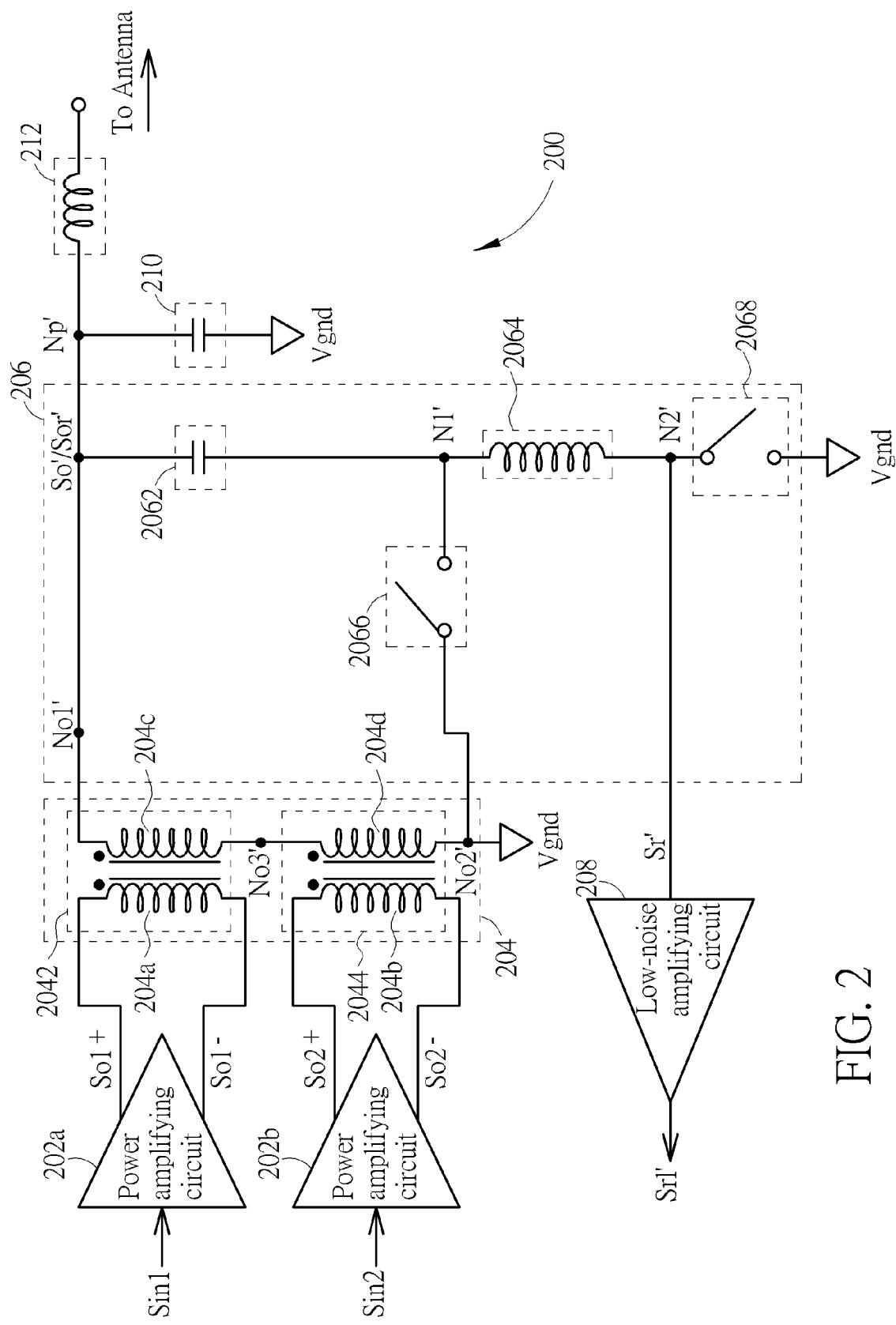
FIG. 2 is a diagram illustrating a transceiver according to a second embodiment of the present invention.

It should be noted that, by using the Balun 104, the transceiver 100 generates the single-ended output signal So according to the differential output signals So+, So− generated by one power amplifying circuit 102. However, this is not a limitation of the present invention. According to a second embodiment, by using a power combiner, a transceiver generates a single-ended output signal according to a plurality of differential output signals generated by a plurality of power amplifying circuits respectively as shown in FIG. 2. Please refer to FIG. 2, which is a diagram illustrating a transceiver 200 according to a second embodiment of the present invention. The transceiver 200 comprises a plurality of power amplifying circuits 202a, 202b, a power combiner 204, a switchable matching circuit 206, a low-noise amplifying circuit 208, a capacitive circuit 210, and an inductive circuit 212. The plurality of power amplifying circuits 202a, 202b are arranged to generate a plurality of differential output signals So1+, So1−, So2+, So2−, respectively. The power combiner 204 is arranged to combine the plurality of differential output signals So1+, So1−, So2+, So2− into a single-ended output signal So'. The switchable matching circuit 206 is arranged to receive the single-ended output signal So' on a signal port Np' of the transceiver 200 during a transmitting mode of the transceiver 200, and to convert a single-ended receiving signal Sor' on the signal port Np' into a single-ended input signal Sr' during a receiving mode of the transceiver 200. The low-noise amplifying circuit 208 is arranged to convert the single-ended input signal Sr' into a low-noise input signal Srl'.

It should be noted that the capacitive circuit 210 is a parasitic capacitor on the signal port Np', which is a semiconductor pad of the transceiver 200. Therefore, the capacitive circuit 210 can be seen as a capacitor coupled between the signal port Np' and a reference voltage, i.e. the ground voltage Vgnd'. Moreover, the inductive circuit 212 is an inherent inductor of a bond-wire coupled between the signal port Np' and the antenna (not shown). Thus, the inductive circuit 212 can be seen as an inductor coupled between the signal port Np' and the antenna, wherein the antenna is arranged to transmit/receive a wireless signal. According to the present embodiment, the power amplifying circuit 202, the power combiner 204, the switchable matching circuit 206, and the low-noise amplifying circuit 208 are configured as a single chip, e.g. an SOC (System-on-chip).

In this embodiment, the plurality of power amplifying circuits 202a, 202b are two differential PA (Power Amplifiers) for generating the first differential output signals So1+, So1− and the second differential output signals So2+, So2− according to a first input signal Sin1 and a second input signal Sin2 respectively, in which the first input signal Sin1 and the second input signal Sin2 can be differential or single-ended signals.

The power combiner 204 comprises a plurality of Baluns 2042, 2044 having a plurality of primary windings 204a, 204b arranged to receive the plurality of differential output signals So1+, So1−, So2+, So2−, respectively, and a plurality of secondary windings 204c, 204d connected in series for generating the single-ended output signal So' according to the plurality of differential output signals So1+, So1−, So2+, So2−. More specifically, the first Balun 2042 comprises the first primary windings 204a and the first secondary windings 204c, and the second Balun 2044 comprises the second primary windings 204b and the second secondary windings 204d as shown in FIG. 2. A first output terminal No1' of the power combiner 204 is used for outputting the single-ended output signal So', and a second output terminal No2' of the power combiner 204 is coupled to the ground voltage Vgnd. The secondary winding 204c is coupled to the secondary winding 204d via a common terminal No3'. Therefore, the secondary winding 204c and the secondary winding 204d are connected in series between the first output terminal No1' and the second output terminal No2.

The switchable matching circuit 206 comprises a capacitive circuit 2062, an inductive circuit 2064, a first switching circuit 2066, and a second switching circuit 2068. The capacitive circuit 2062 is a capacitor having a first terminal coupled to the first output terminal No1' of the power combiner 204. The inductive circuit 2064 is an inductor having a first terminal N1' coupled to a second terminal of the capacitive circuit 2062, and a second terminal N2' coupled to the input terminal of the low-noise amplifying circuit 208. The first switching circuit 2066 is arranged to couple the second terminal (i.e. N1') of the capacitive circuit 2062 to the ground voltage Vgnd during the transmitting mode, and disconnect the second terminal of the capacitive circuit 2062 from the ground voltage Vgnd during the receiving mode. The second switching circuit 2068 is arranged to couple the second terminal N2' of the inductive circuit 2064 to the ground voltage Vgnd during the transmitting mode, and disconnect the second terminal N2' of the inductive circuit 2064 from the ground voltage Vgnd during the receiving mode. It should be noted that the second switching circuit 2068 is optional, which means that the second switching circuit 2068 is can be removed in another embodiment to further reduce the chip size of the transceiver.

According to the second embodiment, i.e. the transceiver 200, the first input signal Sin1 and the second input signal Sin2 may have different phases, and thus the first differential output signals So1+, So1− and the second differential output signals So2+, So2− may also have different phases. Moreover, even though two power amplifying circuits 202a, 202b and two Baluns 2042, 2044 are illustrated in FIG. 2, this is not a limitation of the present invention. Any other number of power amplifying circuits and Baluns also belongs to the scope of the present invention.

It should be noted that other than the feature of how to generate the single-ended output signal, i.e., the transceiver 100 generates the single-ended output signal So by using one power amplifying circuit 102 in combination with one Balun 104 while the transceiver 200 generates the single-ended output signal So' by using the plurality of power amplifying circuits 202a, 202b in combination with the plurality of Baluns 2042, 2044, both the transceiver 100 and the transceiver 200 have the similar operation in the transmitting mode and the receiving mode. Therefore, in the following paragraphs, merely the operation of the transmitting mode and the receiving mode of the transceiver 100 is detailed described. One of ordinary skill in the art will readily appreciate that performing substantially the same operation upon the transceiver 200 may achieve substantially the same result as the transceiver 100. Thus, the detailed description of the transmitting mode and the receiving mode of the transceiver 200 is omitted here for brevity.

Figure 3:
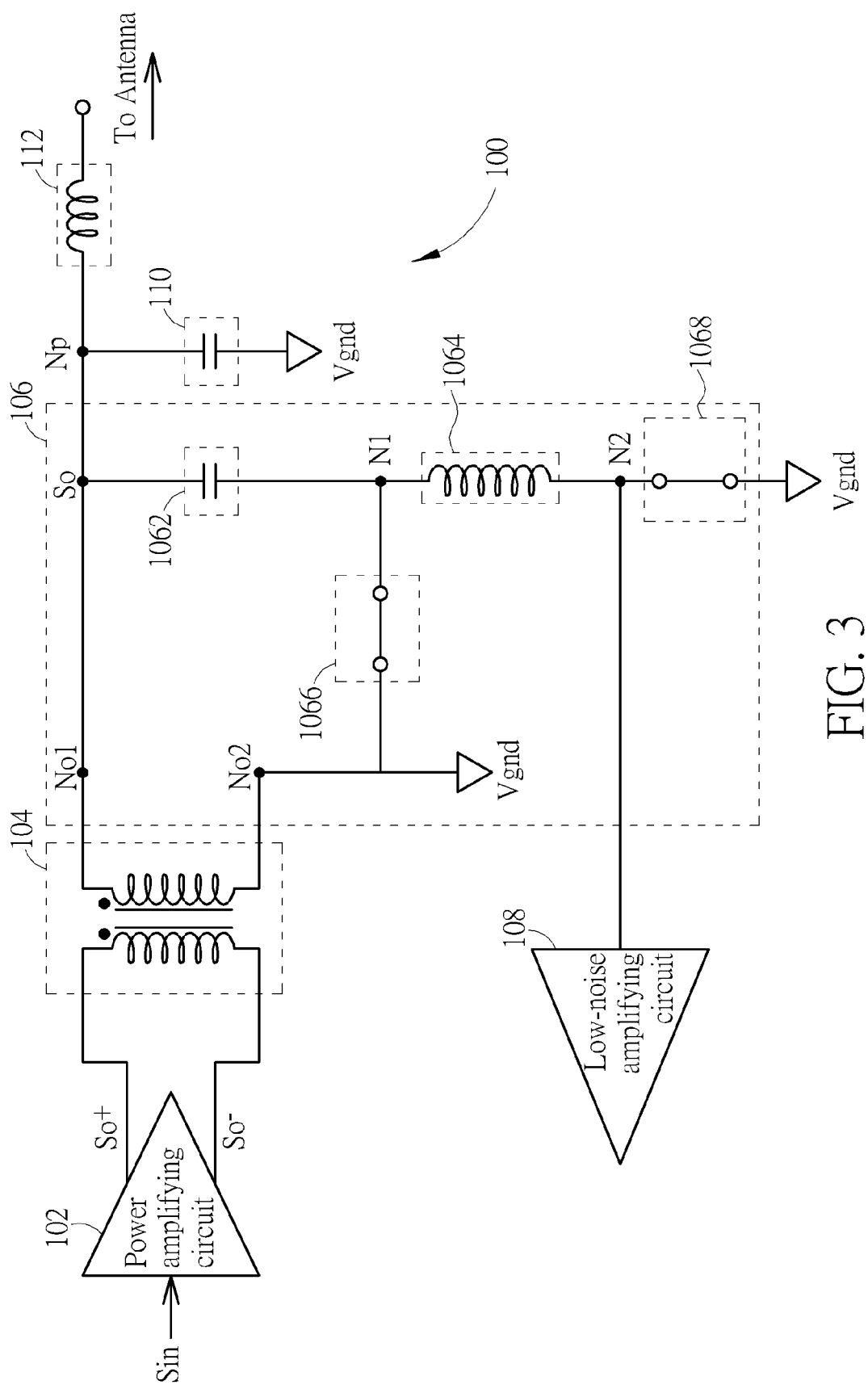
FIG. 3 is a diagram illustrating a transceiver operating under a transmitting mode according to an embodiment of the present invention.

Please refer to FIG. 3, which is a diagram illustrating the transceiver 100 operating under the transmitting mode according to an embodiment of the present invention. When the transceiver 100 operates under the transmitting mode, the first switching circuit 1066 is turned on to couple the second terminal (i.e. N1) of the capacitive circuit 1062 to the ground voltage Vgnd, and the second switching circuit 1068 is turned on to couple the second terminal N2 of the inductive circuit 1064 to the ground voltage Vgnd. Accordingly, when the transceiver 100 operates under the transmitting mode, the inductive circuit 1064 is omitted, and only the capacitive circuit 1062 of the switchable matching circuit 106 is left to connect between the signal port Np and the ground voltage Vgnd. Accordingly, the capacitive circuit 1062, the capacitive circuit 110, and the inductive circuit 112 are configured as a matching circuit between the Balun 104 and the antenna during the transmitting mode. More specifically, the capacitive circuit 1062 can be regarded as a matching circuit between the Balun 104 and the signal port Np. Therefore, by appropriately designing/setting/adjusting the capacitances of the capacitive circuits 1062, 110, and the inductance of the inductive circuit 112, the impedance between the Balun 104 and the antenna can be perfectly matched. Then, after the differential output signals So+, So− are converted/powered up by the Balun 104, the power of the single-ended output signal So can be transmitted to the antenna without degradation or power loss.

It should be noted that, when the transceiver 100 operates under the transmitting mode, the low-noise amplifying circuit 108 may be turned on or turned off, but this is not a limitation of the present invention.

According to the embodiment as shown in FIG. 3, as the second terminal (i.e. N1) of the capacitive circuit 1062 is coupled to the ground voltage Vgnd via the first switching circuit 1066 during the transmitting mode, the signal swing on the second terminal (i.e. N1) of the capacitive circuit 1062 becomes very small and can be omitted even if a bond-wire (not shown) is used to connect the other terminal of the first switching circuit 1066 (i.e. the second output terminal No2) to the ground voltage Vgnd. Therefore, the first switching circuit 1066 can be fabricated/implemented by a normal p-well semiconductor process rather than a deep n-well semiconductor process, such that the first switching circuit 1066 is a normal p-well circuit. In this embodiment, the power amplifying circuit 102, the Balun 104, the switchable matching circuit 106, and the low-noise amplifying circuit 108 are all fabricated under the normal p-well semiconductor process, and no deep n-well semiconductor process is used. It should be noted that a normal p-well circuit is a circuit implanted on a p-well of a p-type substrate, and a deep n-well circuit is a circuit implanted on a p-well of an N-type substrate/well, where the N-type substrate/well is further implanted on a p-type substrate. As the power amplifying circuit 102, the Balun 104, the switchable matching circuit 106, and the low-noise amplifying circuit 108 are all fabricated under the normal p-well semiconductor process, the cost of the transceiver 100 is lower than the counterpart fabricated under the deep n-well semiconductor process.

Figure 4:
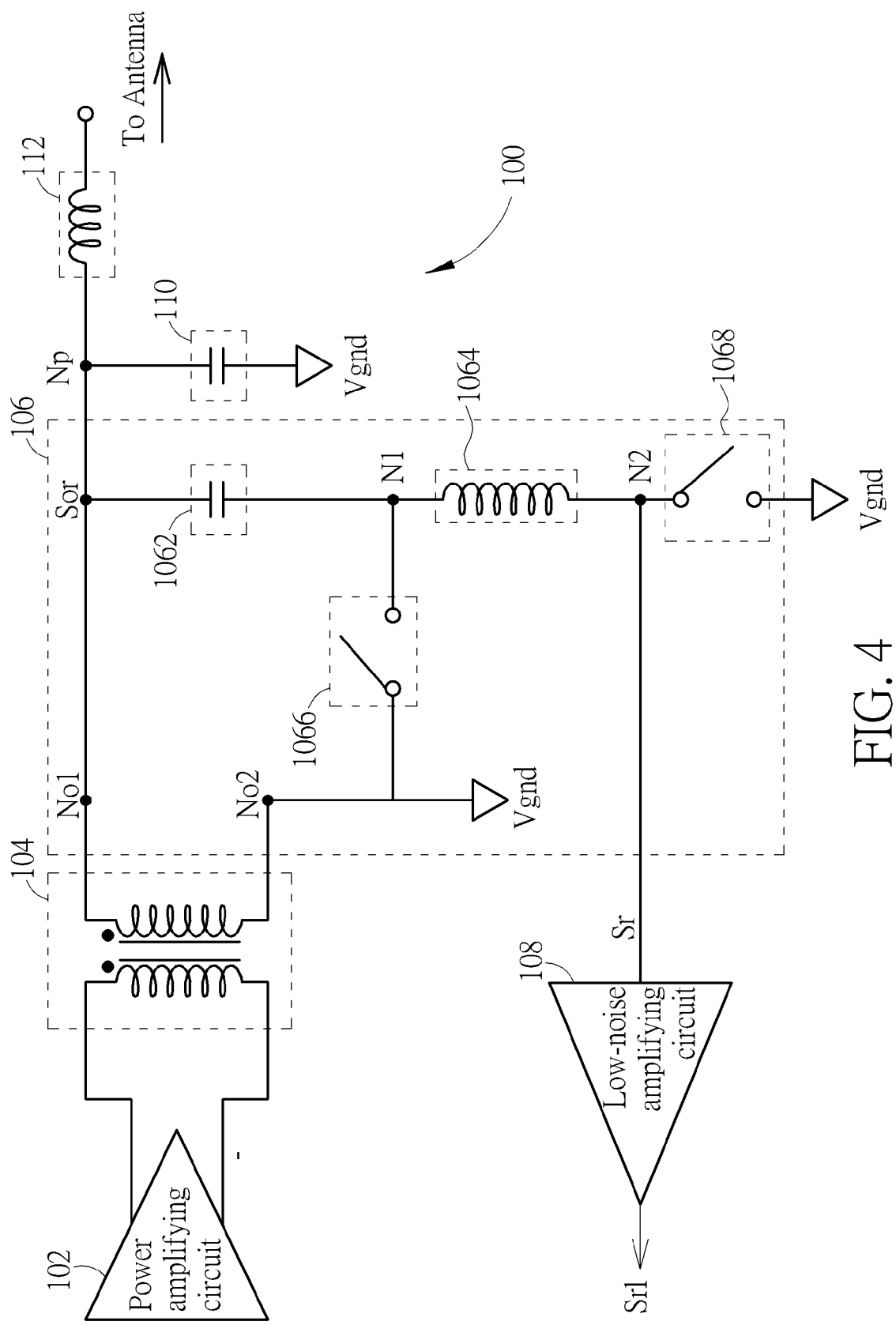
FIG. 4 is a diagram illustrating a transceiver operating under a receiving mode according to an embodiment of the present invention.

Please refer to FIG. 4, which is a diagram illustrating the transceiver 100 operating under the receiving mode according to an embodiment of the present invention. When the transceiver 100 operates under the receiving mode, the first switching circuit 1066 is turned off to disconnect the second terminal (i.e. N1) of the capacitive circuit 1062 from the ground voltage Vgnd, and the second switching circuit 1068 is turned off to disconnect the second terminal N2 of the inductive circuit 1064 from the ground voltage Vgnd. Accordingly, when the transceiver 100 operates under the receiving mode, the inductive circuit 112, the capacitive circuit 110, the capacitive circuit 1062, and the inductive circuit 1064 are configured as a matching circuit between the low-noise amplifying circuit 108 and the antenna during the receiving mode. More specifically, the capacitive circuit 1062 and the inductive circuit 1064 can be regarded as a matching circuit between the input terminal of the low-noise amplifying circuit 108 and the signal port Np. Therefore, by appropriately designing/setting/adjusting the capacitances of the capacitive circuits 1062, 110, and the inductances of the inductive circuits 1064, 112, the impedance between the low-noise amplifying circuit 108 and the antenna can be perfectly matched. After the wireless signal (not shown) is received by the antenna, the power of the single-ended receiving signal Sor can be transmitted to the low-noise amplifying circuit 108 without degradation or power loss. The low-noise amplifying circuit 108 then converts the single-ended input signal Sr into the low-noise input signal Srl. It should be noted that the low-noise input signal Srl may be a single-ended signal or differential signals, and this is not a limitation of the present invention.

The input impedance looking into the low-noise amplifying circuit 108 is designed to be high impedance according to the embodiment of the present invention. Therefore, to match the input impedance of the low-noise amplifying circuit 108, the impedance looking into the inductive circuits 1064 from the second terminal N2 can be adjusted/increased/boosted up by both the inductances of the inductive circuits 1064 and 112 since the inductive circuits 1064 and 112 are connected in series when the transceiver 100 operates under the receiving mode. As the inductive circuit 1064 is an on-chip inductor, the low-noise amplifying circuit 108 has good performance in the NF (Noise Figure).

It should further be noted that, when the transceiver 100 operates under the receiving mode, the power amplifying circuit 102 may be turned off/disabled/powered off to stop generating the differential output signals So+, So−. Even if the power amplifying circuit 102 is turned off/disabled/powered off when the transceiver 100 operates under the receiving mode, however, the PA loading (i.e. the loading looking into the first output terminal No1 of the Balun 104) may affect the performance of the low-noise amplifying circuit 108. Therefore, the PA loading is also taken into consideration when deciding the values of the capacitive circuit 1062 and the inductive circuit 1064.

Figure 5:
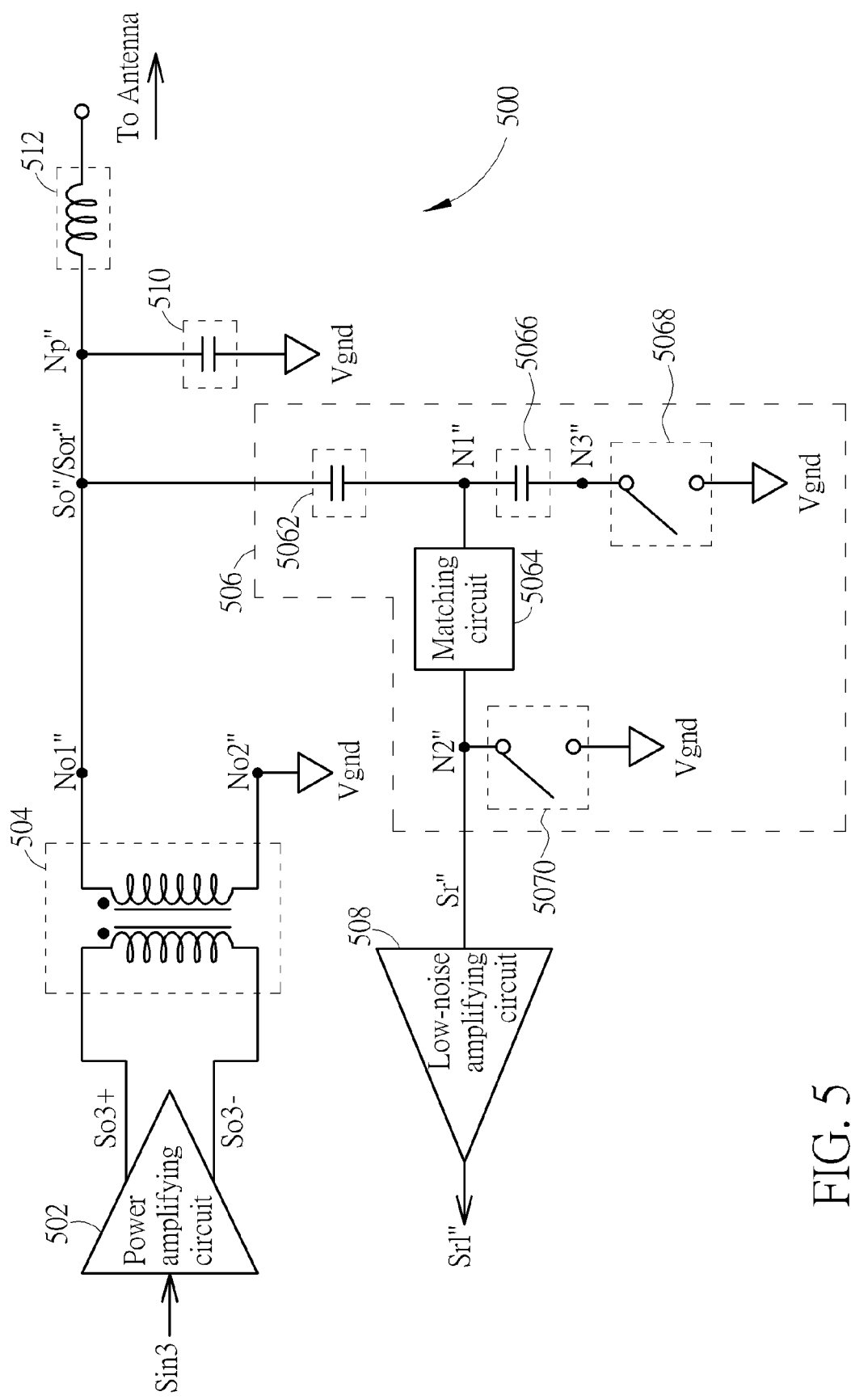
FIG. 5 is a diagram illustrating a transceiver according to a third embodiment of the present invention.

Please refer to FIG. 5, which is a diagram illustrating a transceiver 500 according to a third embodiment of the present invention. The transceiver 500 comprises a power amplifying circuit 502, a Balun 504, a switchable matching circuit 506, a low-noise amplifying circuit 508, a capacitive circuit 510, and an inductive circuit 512. The power amplifying circuit 502 is arranged to generate differential output signals So3+, So3−. The Balun 504 is arranged to convert the differential output signals So3+, So3− into a single-ended output signal So". The switchable matching circuit 506 is arranged to receive the single-ended output signal So" on a signal port Np" of the transceiver 500 during a transmitting mode of the transceiver 500, and to convert a single-ended receiving signal Sor" on the signal port Np" into a single-ended input signal Sr" during a receiving mode of the transceiver 500. The low-noise amplifying circuit 508 is arranged to convert the single-ended input signal Sr" into a low-noise input signal Srl".

It should be noted that the capacitive circuit 510 is a parasitic capacitor on the signal port Np", which is a semiconductor pad of the transceiver 500. Therefore, the capacitive circuit 510 can be seen as a capacitor coupled between the signal port Np" and a reference voltage, i.e. the ground voltage Vgnd. Moreover, the inductive circuit 512 is an inherent inductor of a bond-wire coupled between the signal port Np" and the antenna (not shown). Thus, the inductive circuit 512 can be seen as an inductor coupled between the signal port Np" and the antenna, wherein the antenna is arranged to transmit/receive a wireless signal. According to the present embodiment, the power amplifying circuit 502, the Balun 504, the switchable matching circuit 506, and the low-noise amplifying circuit 508 are configured as a single chip, e.g. an SOC (System-on-chip).

The power amplifying circuit 502 is a differential PA (Power Amplifier) for generating the differential output signals So3+, So3− according to an input signal Sin3, which can be a differential or single-ended signal. The Balun 504 is a transformer, which comprises a first input terminal receiving the output signal So3+, and a second input terminal receiving the output signal So3−. The Balun 504 further comprises a first output terminal No1" for outputting the single-ended output signal So" and a second output terminal No2" coupled to the ground voltage Vgnd.

The switchable matching circuit 506 comprises a first capacitive circuit 5062, a matching circuit 5064, a second capacitive circuit 5066, a first switching circuit 5068, and a second switching circuit 5070. The capacitive circuit 5062 is a capacitor having a first terminal coupled to the first output terminal No1" of the Balun 504. The matching circuit 5064 has a first terminal N1" coupled to a second terminal of the capacitive circuit 5062, and a second terminal N2" coupled to the input terminal of the low-noise amplifying circuit 508. The second capacitive circuit 5066 having a first terminal coupled to the second terminal N1" of the first capacitive circuit 5062. The first switching circuit 5068 is arranged to couple a second terminal N3" of the second capacitive circuit 5066 to the reference voltage Vgnd during the transmitting mode, and disconnect the second terminal N3" of the second capacitive circuit 5066 from the reference voltage Vgnd during the receiving mode. It should be noted that the similar effect can also be obtained via the rearrangement of the second capacitive circuit 5066 and the first switching circuit 5068 as long as the second capacitive circuit 5066 is connected with the first switching circuit 5068 in series. Therefore, in another exemplary embodiment of the present transceiver, the first switching circuit 5068 is rearranged to connect between the terminal N1" and the terminal N3", and the second capacitive circuit 5066 is rearranged to connect between the terminal N3" and the reference voltage Vgnd while the rest of the components are the same as those in FIG. 5. The detailed description of this exemplary embodiment is omitted here for brevity.

The second switching circuit 5070 is arranged to couple the second terminal N2" of the matching circuit 5064 to the reference voltage Vgnd during the transmitting mode, and disconnect the second terminal N2" of the matching circuit 5064 from the reference voltage Vgnd during the receiving mode.

In this embodiment, i.e. the transceiver 500, the capacitance of the second capacitive circuit 5066 is substantially ten times larger than the capacitance of the first capacitive circuit 5062, and/or the impedance of the second capacitive circuit 5066 is less than the impedance of the matching circuit 5064. Accordingly, during the receiving mode of the transceiver 500, i.e. when the first switching circuit 5068 and the second switching circuit 1070 are opened, the first capacitive circuit 5062, the Balun 504, and the matching circuit 5064 are arranged to match the impedance between the input impedance of the low-noise amplifying circuit 508 and the signal port Np". During the transmitting mode of the transceiver 500, i.e. when the first switching circuit 5068 and the second switching circuit 5070 are closed, the signal at the terminal N1" is attenuated by the ratio between the capacitance of the second capacitive circuit 5066 and the capacitance of the first capacitive circuit 5062. For example, the signal at the terminal N1" may be attenuated by 20 dB due to the ratio between the capacitance of the second capacitive circuit 5066 and the capacitance of the first capacitive circuit 5062. In addition, since the second switching circuit 5070 connects the terminal N2" to the ground voltage Vgnd during the transmitting mode of the transceiver 500, the signal at the terminal N1" may get extra attauantion during the transmitting mode of the transceiver 500. Therefore, the low-noise amplifying circuit 508 is not damaged by the large power signal (i.e. So") generated by the power amplifying circuit 502 during the transmitting mode of the transceiver 500.

It should be noted that other than the switchable matching circuit 506, both the transceiver 100 and the transceiver 500 have the similar operation in the transmitting mode and the receiving mode. Therefore, the detailed description of the transmitting mode and the receiving mode of the transceiver 500 can also referred to the above-mentioned FIG. 3 and FIG. 4. Thus, the detailed description of the transmitting mode and the receiving mode of the transceiver 500 is omitted here for brevity.

Figure 6:
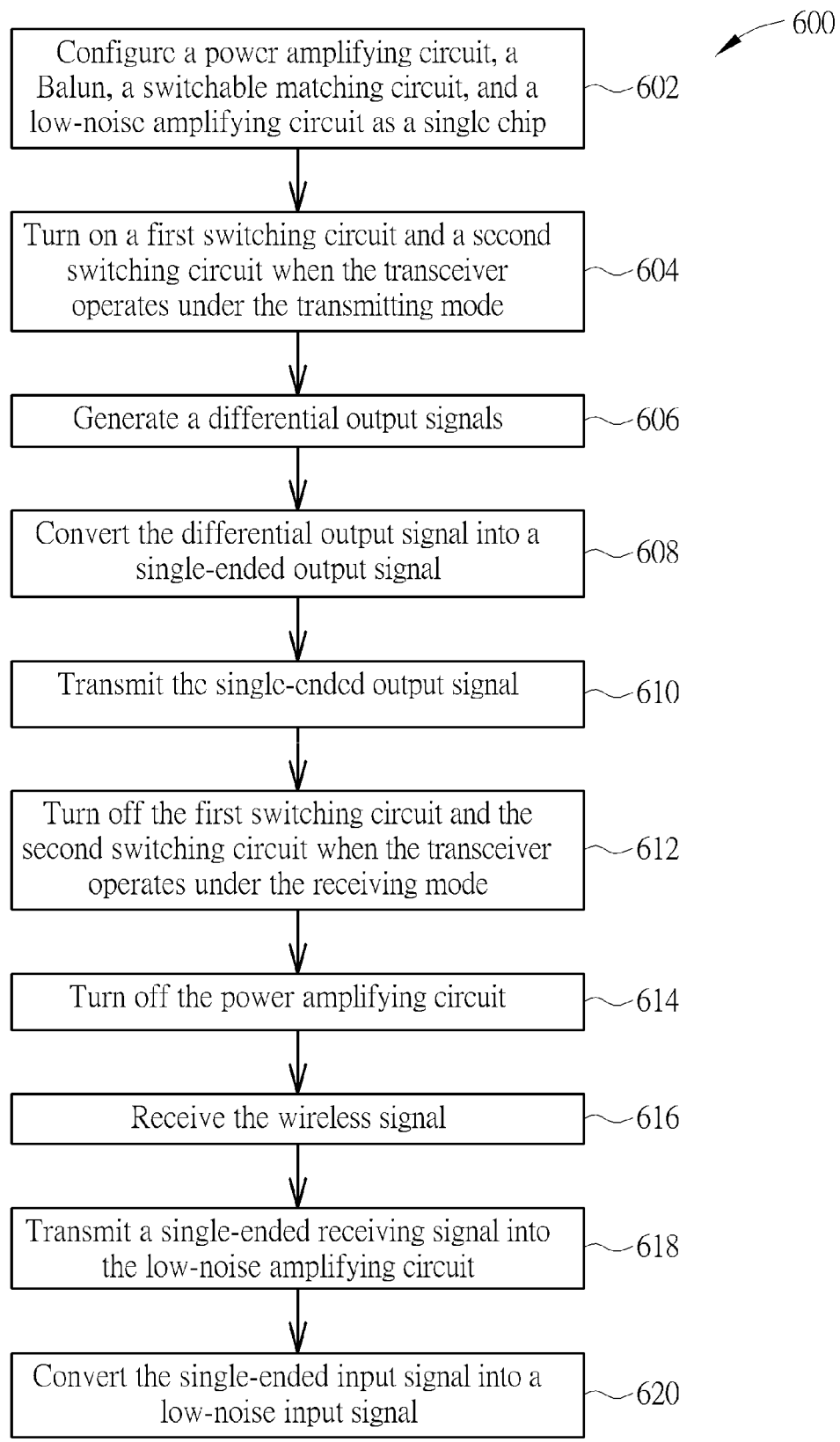
FIG. 6 is a flowchart illustrating a switching method of a transceiver according to an embodiment of the present invention.

The operation of the above mentioned embodiments (e.g. transceiver 100, 200, 500) can be summarized into the following steps as shown in FIG. 6. FIG. 6 is a flowchart illustrating a switching method 600 of the transceiver according to an embodiment of the present invention. For brevity, the switching method 600 is described in conjunction with the transceiver 100. Provided that substantially the same result is achieved, the steps of the flowchart shown in FIG. 6 need not be in the exact order shown and need not be contiguous; that is, other steps can be intermediate. The switching method 600 comprises:

Step 602: Configure the power amplifying circuit 102, the Balun 104, the switchable matching circuit 106, and the low-noise amplifying circuit 108 as a single chip;

Step 604: Turn on the first switching circuit 1066 to couple the second terminal (i.e. N1) of the capacitive circuit 1062 to the ground voltage Vgnd, and turn on the second switching circuit 1068 to couple the second terminal N2 of the inductive circuit 1064 to the ground voltage Vgnd when the transceiver 100 operates under the transmitting mode;

Step 606: Use the power amplifying circuit 102 to generate the differential output signals So+, So−;

Step 608: Use the Balun to convert the differential output signals So+, So− into the single-ended output signal So;

Step 610: Transmit the single-ended output signal So to the antenna;

Step 612: Turn off the first switching circuit 1066 to disconnect the second terminal (i.e. N1) of the capacitive circuit 1062 from the ground voltage Vgnd, and turn off the second switching circuit 1068 to disconnect the second terminal N2 of the inductive circuit 1064 from the ground voltage Vgnd when the transceiver 100 operates under the receiving mode;

Step 614: Turn off the power amplifying circuit 102;
Step 616: Receive the wireless signal from the antenna;
Step 618: Transmit the single-ended receiving signal Sor on the signal port Np into the input terminal (i.e. N2) of the low-noise amplifying circuit 108;
Step 620: Use the low-noise amplifying circuit 108 to convert the single-ended input signal Sr into the low-noise input signal Srl.

Figure 7:
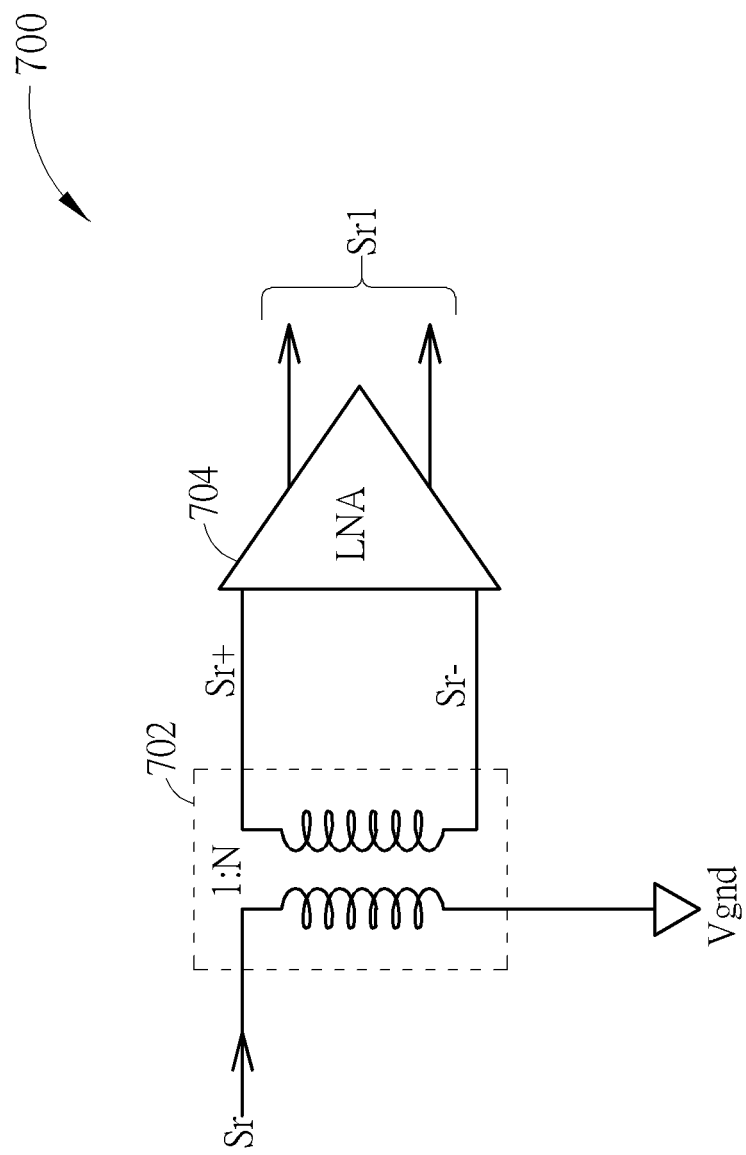
FIG. 7 is a diagram illustrates a low-noise amplifying circuit according to an embodiment of the present invention.

Moreover, in the above mentioned embodiments, i.e. transceivers 100, 200, and 500, their respective low-noise amplifying circuits 108, 208, and 508 are single ended to single ended low-noise amplifier. However, this is not a limitation of the present invention. The low-noise amplifying circuit can also be a single ended to differential ended low-noise amplifier. Please refer to FIG. 7, which is a diagram illustrates a low-noise amplifying circuit 700 according to an embodiment of the present invention. The low-noise amplifying circuit 700 comprises a Balun 702 and a differential low-noise amplifier (LNA) 704. The Balun 702 has a winding turns ratio of 1:N, and the Balun 702 is arranged to convert a single-ended input signal (e.g. Sr) into a differential input signals Sr+, Sr−. The differential low-noise amplifier 702 is arranged to convert the differential input signals Sr+, Sr− into the low-noise input signal (e.g. Srl) during the receiving mode, and the low-noise input signal Srl is a differential low-noise signal. Accordingly, by using the low-noise amplifying circuit as shown in FIG. 7, the transceivers 100, 200, and/or 500 can also be modified to have a differential low-noise amplifier. One ordinary skill in the art is appreciated to understand the operation of the modified transceivers 100, 200, and/or 500, thus the detailed description is omitted here for brevity.

Briefly, the transceiver 100 is designed to have an on-chip TR switch (i.e. the switchable matching circuit 106) installed between a single-ended output terminal (i.e. No1) of the power amplifier (i.e. the power amplifying circuit 102 in conjunction with the Balun 104) and the single-ended input terminal (i.e. N2) of the low-noise amplifying circuit 108, an on-chip Balun 104 installed between the output terminals of the power amplifying circuit 102 and the on-chip TR switch, a differential power amplifying circuit (i.e. 102) capable of generating differential signals to the Balun 104, and a single-ended low-noise amplifier (i.e. 108) receiving a single-ended signal from the on-chip TR switch. By doing this, the switching losses of the switchable matching circuit 106 at the transmitting mode and the receiving mode are reduced, the impedance matching at the output terminal (i.e. No1) of the power amplifier (i.e. the power amplifying circuit 102 in conjunction with the Balun 104) and the impedance matching at the input terminal (i.e. N2) at the low-noise amplifying circuit 108 can be finely tuned, and the chip size of the transceiver 100 is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver, comprising:
   a power amplifying circuit, arranged to generate differential output signals during a transmitting mode of the transceiver;
   a first balance-unbalance circuit (Balun), arranged to convert the differential output signals into a single-ended output signal;
   a switchable matching circuit, arranged to receive the single-ended output signal on a signal port of the transceiver during the transmitting mode, and to convert a single-ended receiving signal on the signal port into a single-ended input signal during a receiving mode of the transceiver; and a low-noise amplifying circuit, arranged to convert the single-ended input signal into a low-noise input signal during the receiving mode.

2. The transceiver of claim 1, wherein a first circuit of the switchable matching circuit is configured as a first matching circuit between the first Balun and the signal port during the transmitting mode, and the first circuit and a second circuit of the switchable matching circuit are configured as a second matching circuit between the signal port and the low-noise amplifying circuit during the receiving mode.

3. The transceiver of claim 1, further comprising:
a capacitive circuit, configured between the signal port and the reference voltage; and
an inductive circuit, configured between the signal port and an antenna.

4. The transceiver of claim 3, wherein a first circuit of the switchable matching circuit, the capacitive circuit, and the inductive circuit are configured as a first matching circuit between the first Balun and the antenna during the transmitting mode, and the first circuit of the switchable matching circuit, the capacitive circuit, a second circuit of the switchable matching circuit, and the inductive circuit are configured as a second matching circuit between the antenna and the low-noise amplifying circuit during the receiving mode.

5. The transceiver of claim 3, wherein the capacitive circuit is a parasitic capacitor of the signal port, and the inductive circuit is an inherent inductor of a bond-wire coupled between the signal port and the antenna.

6. The transceiver of claim 1, wherein the low-noise amplifying circuit comprises:
a second Balun, arranged to convert the single-ended input signal into a differential input signals; and
a differential low-noise amplifier, arranged to convert the differential input signals into the low-noise input signal during the receiving mode, and the low-noise input signal is a differential low-noise signal.

7. The transceiver of claim 1, wherein the power amplifying circuit, the first Balun, and the low-noise amplifying circuit are configured in a single chip.

8. The transceiver of claim 1, wherein the power amplifying circuit and the low-noise amplifying circuit are configured in a single chip.

9. The transceiver of claim 1, wherein the power amplifying circuit and the first Balun are configured in a single chip.

10. A transceiver, comprising:
a plurality of power amplifying circuits, arranged to generate a plurality of differential output signals respectively during a transmitting mode of the transceiver;
a power combiner, arranged to combine the plurality of differential output signals into a single-ended output signal;
a switchable matching circuit, arranged to receive the single-ended output signal on a signal port of the transceiver during the transmitting mode, and to convert a single-ended receiving signal on the signal port into a single-ended input signal during a receiving mode of the transceiver; and
a low-noise amplifying circuit, arranged to convert the single-ended input signal into a low-noise input signal during the receiving mode.

11. The transceiver of claim 10, wherein the power combiner comprises a plurality of balance-unbalance circuits (Baluns) having a plurality of primary windings arranged to receive the plurality of differential output signals respectively, and a plurality of secondary windings connected in series for generating the single-ended output signal according to the plurality of differential output signals.

12. A transceiver, comprising:
a power amplifying circuit, arranged to generate differential output signals during a transmitting mode of the transceiver;
a first balance-unbalance circuit (Balun), arranged to convert the differential output signals into a single-ended output signal;
a matching circuit, arranged to convert a single-ended receiving signal into a single-ended input signal during a receiving mode of the transceiver; and
a low-noise amplifying circuit, arranged to convert the single-ended input signal into a low-noise input signal during the receiving mode;
wherein the power amplifying circuit, the first Balun, the matching circuit and the low-noise amplifying circuit are configured in a single chip.

13. A transceiver, comprising:
a power amplifying circuit, arranged to generate differential output signals during a transmitting mode of the transceiver;
a first balance-unbalance circuit (Balun), arranged to convert the differential output signals into a single-ended output signal;
a matching circuit, arranged to convert a single-ended receiving signal into a single-ended input signal during a receiving mode of the transceiver; and
a low-noise amplifying circuit, arranged to convert the single-ended input signal into a low-noise input signal during the receiving mode.

* * * * *